Dec. 17, 1968 H. L. STAVENAU ETAL Re. 26,508

CLOSURE OPERATOR

Original Filed July 7, 1955 6 Sheets-Sheet 1

INVENTORS
HAROLD L. STAVENAU
DAN M. PARK
BY Paul Moore & Hugger
ATTORNEYS

CLOSURE OPERATOR

Original Filed July 7, 1955 6 Sheets-Sheet 2

INVENTORS
HAROLD L. STAVENAU
DAN M. PARK
BY Paul Moore Rugger
ATTORNEYS

CLOSURE OPERATOR

Original Filed July 7, 1955 6 Sheets-Sheet 3

INVENTORS
HAROLD L. STAVENAU
DAN M. PARK
By Paul, Moore & Rugger
ATTORNEYS

CLOSURE OPERATOR

Original Filed July 7, 1955 6 Sheets-Sheet 4

INVENTORS
HAROLD L. STAVENAU
DAN M. PARK
By Paul, Moore & Hyson
ATTORNEYS

CLOSURE OPERATOR

Original Filed July 7, 1955 6 Sheets-Sheet 5

INVENTORS
HAROLD L. STAVENAU
DAN M. PARK
By Paul, Moore & Rugger
ATTORNEYS

CLOSURE OPERATOR

Original Filed July 7, 1955 6 Sheets-Sheet 6

INVENTORS
HAROLD L. STAVENAU
DAN M. PARK
By Paul, Moore & Hugger
ATTORNEYS

United States Patent Office

Re. 26,508
Reissued Dec. 17, 1968

26,508
CLOSURE OPERATOR

Harold L. Stavenau, Owatonna, Minn., and Dan M. Park, Madison, Wis., assignors to Truth Tool Company, Mankato, Minn., a corporation of Minnesota Original No. 2,775,446, dated Dec. 25, 1956, Ser. No. 520,555, July 7, 1955. Application for reissue Feb. 12, 1968, Ser. No. 706,999
20 Claims. (Cl. 49—324)

Matter enclosed in heavy brackets [ ] appears in the original patent but forms no part of this reissue specification; matter printed in italics indicates the additions made by reissue.

*ABSTRACT OF THE DISCLOSURE*

*A closure operator for awning type windows in which a support frame is mounted on a window frame with a pair of arms pivotally mounted on the support frame and extending therefrom for swinging movement in opposite directions relative to the support frame. A manual member is pivotally mounted on the support frame for oscillatory rotation through less than one complete turn between limiting positions generally parallel to the window frame about an axis parallel to the arm pivot. Eccentric link means pivotally connects the manual member with the arms for swinging the arms on the manual member is rotated between its limiting positions. The arms are attached to the window by a connecting means which has freedom of motion about an axis parallel to the arm pivot and in a plane normal to said axis.*

This invention relates to closure operators and more especially to manual operators for opening and closing windows, doors, hatchway closures and the like, where the primary purpose of the opening is ventilation rather than access. A principal field of usefulness of the invention is as a window operator for canopy, and outwardly opening casement windows of dwelling houses. Window operators heretofore in common use for such purposes have been in two main classes, i.e., the slide-bar type and the crank type. Each is subject to many disadvantages. The slide-bar type, while economical to make, has had the disadvantage of unsightliness, undue projection into the building during partial opening and lack of adjustability, or alternatively, cumbersome mode of adjustment. The crank types, while being more attractive in appearance, have the disadvantage of high cost and lack of strength and, in addition, poor adaptability to the modern canopy-type windows.

It is an object of the present invention to provide an improved closure operator mechanism free from the aforesaid objections of the prior commonly used devices, and in addition to provide strong and durable mechanisms which can be manufactured at low cost for operating canopy windows, outwardly opening casement windows and the like.

It is a further object of the invention to provide an improved but inexpensive window operator for canopy and casement windows.

It is another object of the invention to provide a closure operator of great strength and holding ability, capable of securely holding the window when in the closed position, yet capable of being detachably manipulated to allow extreme positioning of the window for cleaning, servicing, application or detachment of storm windows, and the like.

It is a further object of the invention to provide a closure operator of simple construction, durably made and capable of long life, and in which such parts as are necessarily exposed are of functional simplicity and comely appearance.

Other objects of the invention are those inherent in the apparatus herein illustrated, described and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein.

Figures 4, 5:
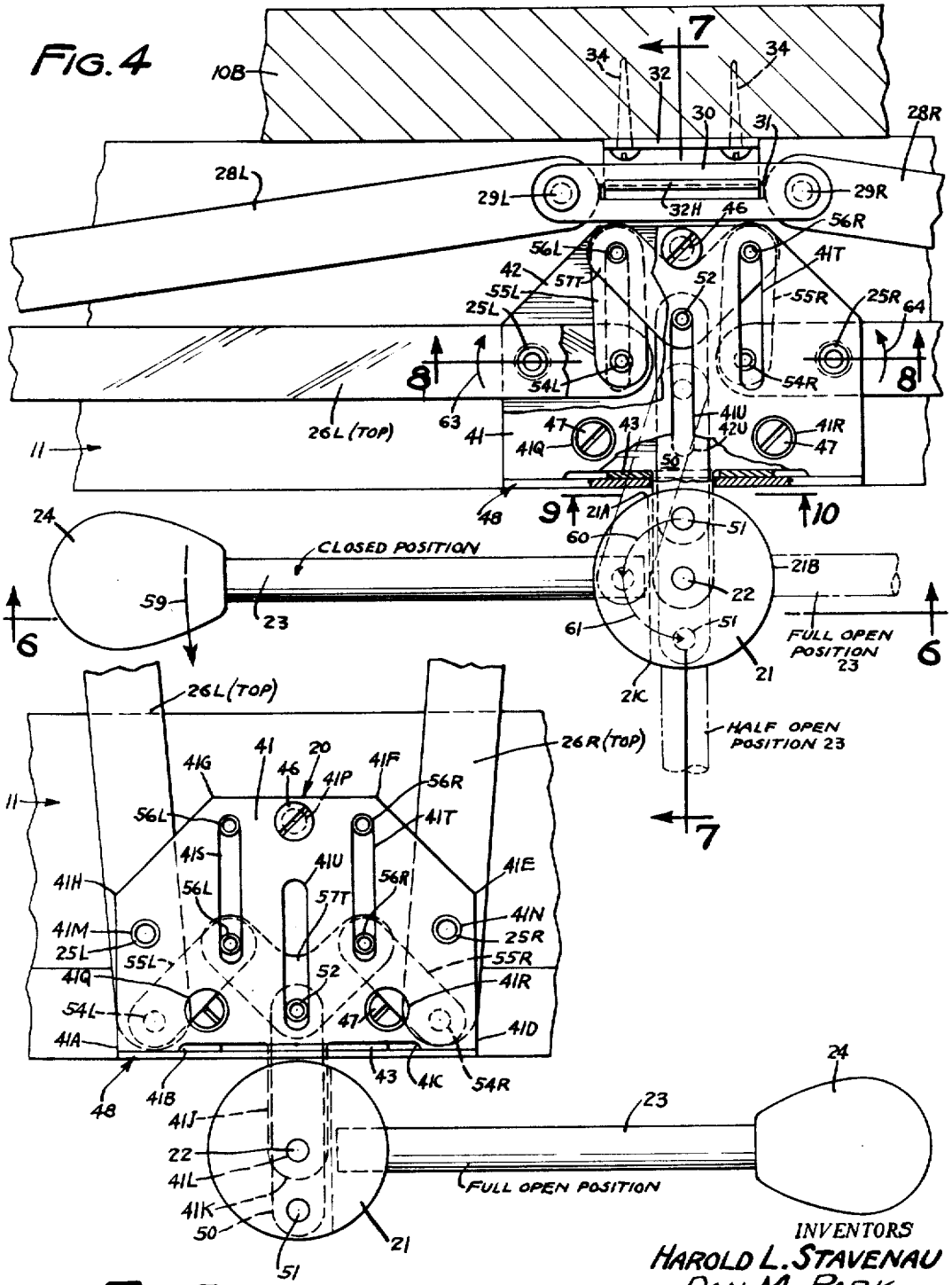

FIGURE 4 is an enlarged, fragmentary, plan view of the operator mechanism, partly broken away. In this figure the mechanism is shown in full lines in "closed position" (window closed). In addition the operator handle and link portions of the mechanism are shown in dotted lines for the "half open" and "full open" positions.

FIGURE 5, also an enlarged, fragmentary plan view, corresponds to FIGURE 4, and in addition the mechanism is shown in the "full open" position.

Figure 6:
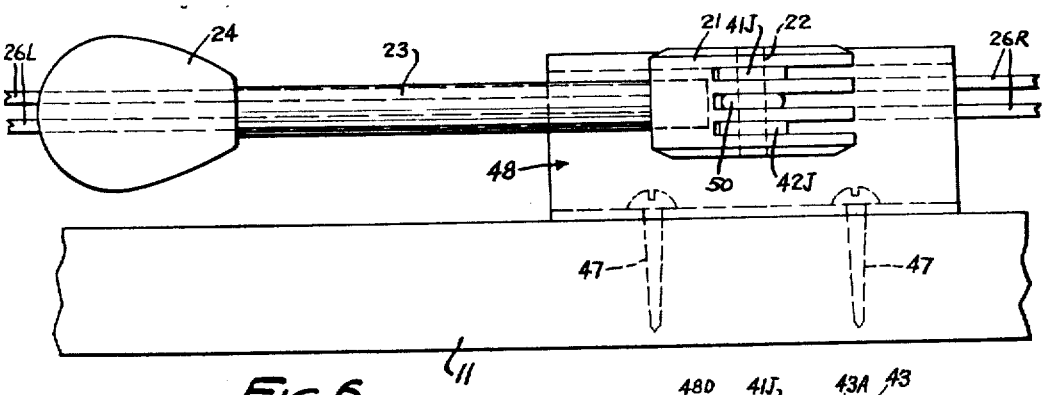

FIGURE 6 is an enlarged fragmentary elevational view, showing the operator mechanism from the inside of the building. This view is taken along the line and in the direction of arrows 6—6 of FIGURE 4.

Figure 7:
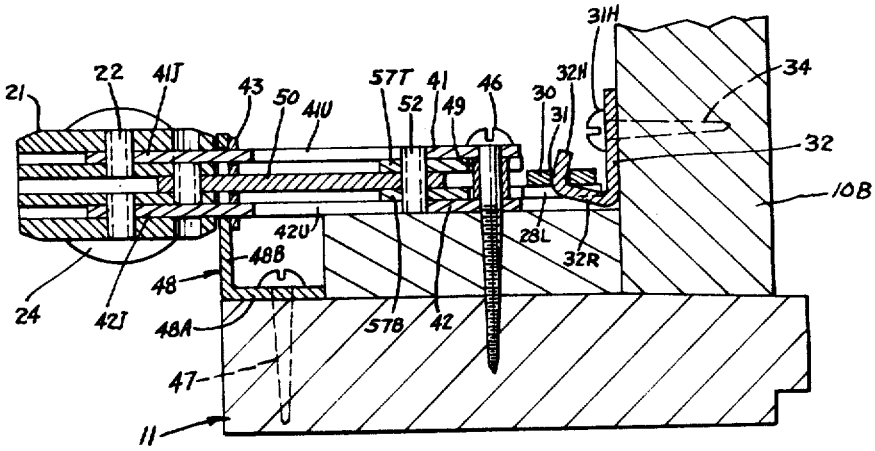

FIGURE 7 is a vertical transverse sectional view, taken along the line and in the direction of arrows 7—7 of FIGURE 4.

Figure 8:
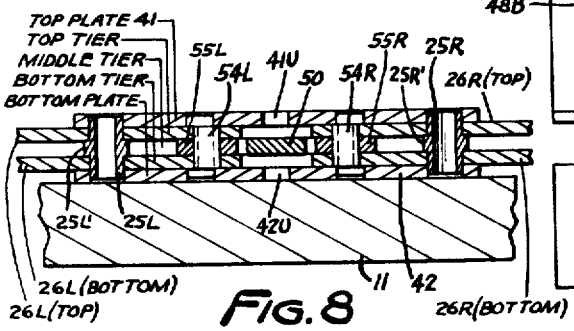

FIGURE 8 is a vertical sectional view taken along the line and in the direction of arrows 8—8 of FIGURE 4.

Figure 9:
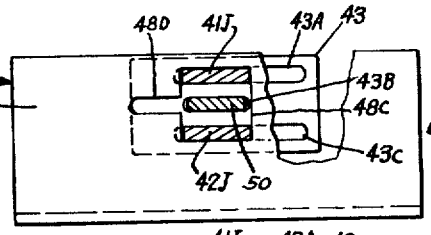
Figure 10:
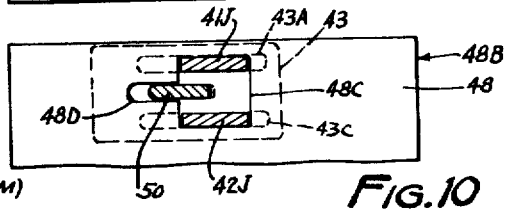

FIGURES 9 and 10 are related fragmentary vertical sectional views taken along the line and in the direction of arrows 9–10 of FIGURE 4. FIGURE 9 is partly broken away and illustrates the mechanism in the "closed position," whereas FIGURE 10 shows the same mechanism in the "half open" position.

Figures 2, 11:
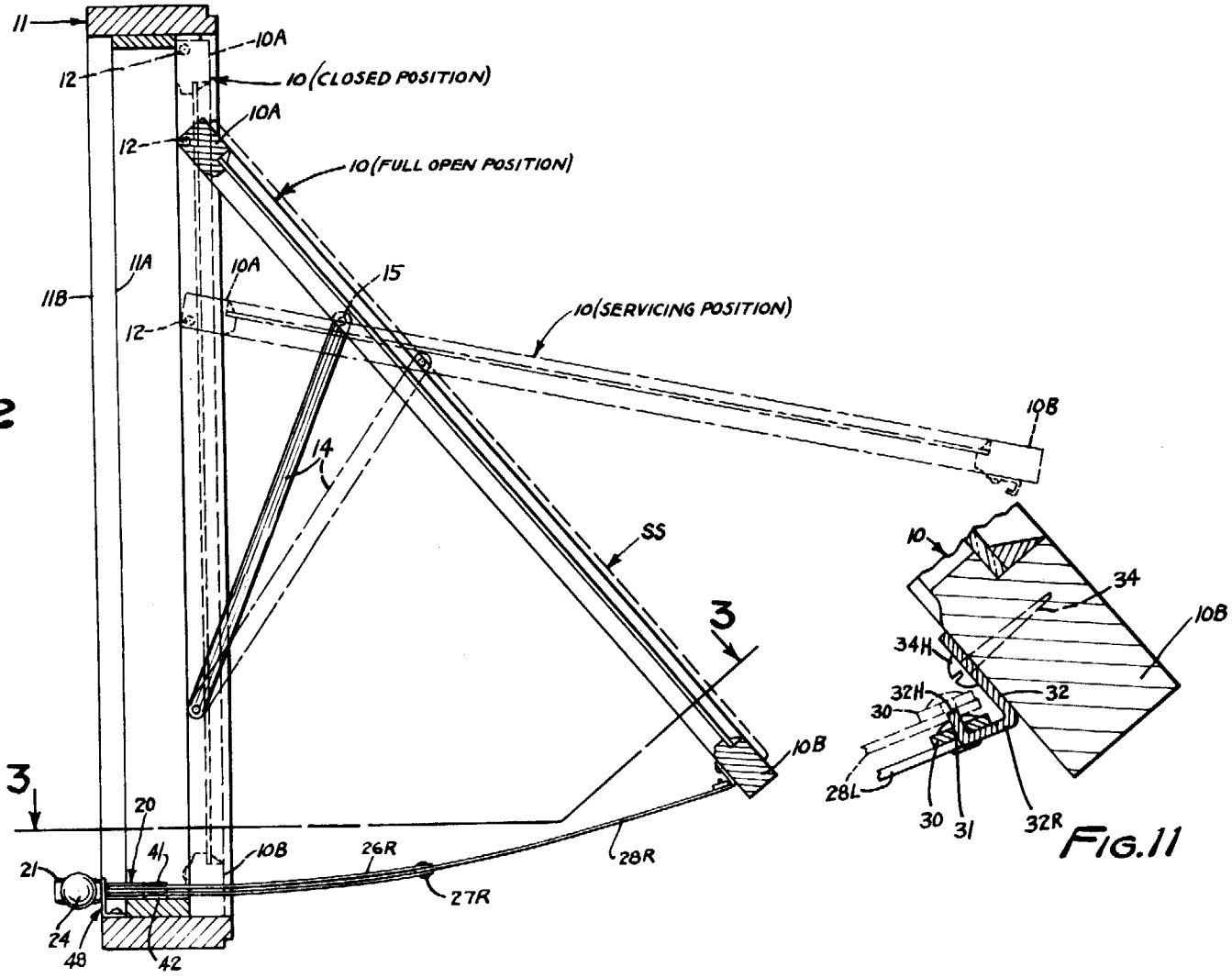
FIGURE 2 is a vertical-sectional view of the window and operator of the present invention, this view being taken along the line and in the direction of arrows 2—2 of FIGURE 1.

FIGURE 11 is an enlarged fragmentary vertical sectional view, for illustrative purposes, and shows how the operator mechanism may be detached when the window is open, thereby allowing extreme movement of the window to the dotted line position of FIGURE 2, for cleaning, servicing storm sash, painting, etc. This view is related (for explanation of operation) to the views in FIGURES 2 and 7.

Figure 12:
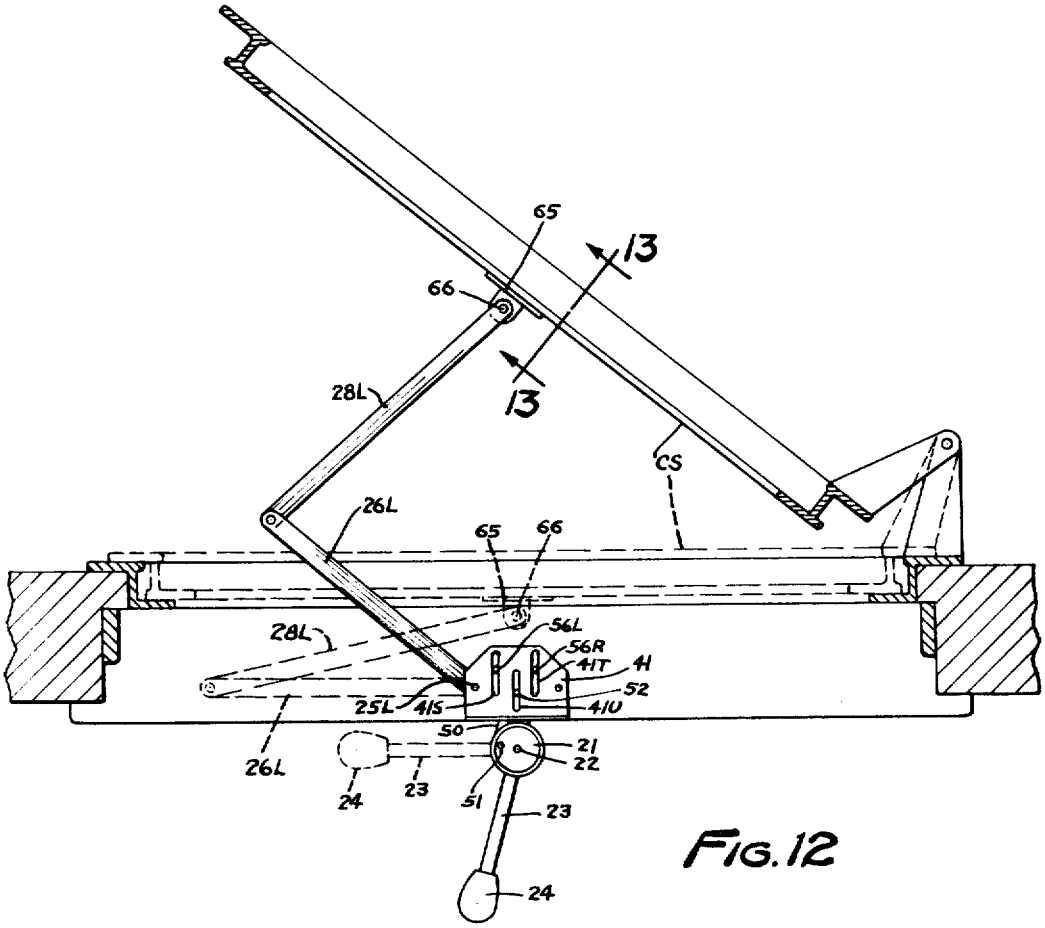

FIGURE 12 is a horizontal section through a typical casement window, illustrating a modified form of operating mechanism of the present invention mounted for operating said window.

Figure 13:
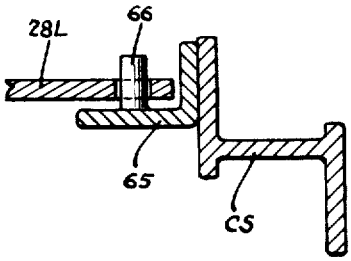

FIGURE 13 is a fragmentary enlarged sectional view taken in the direction of arrows 13—13 of FIGURE 12.

Throughout the drawings the same numerals refer to corresponding parts.

Figure 1:
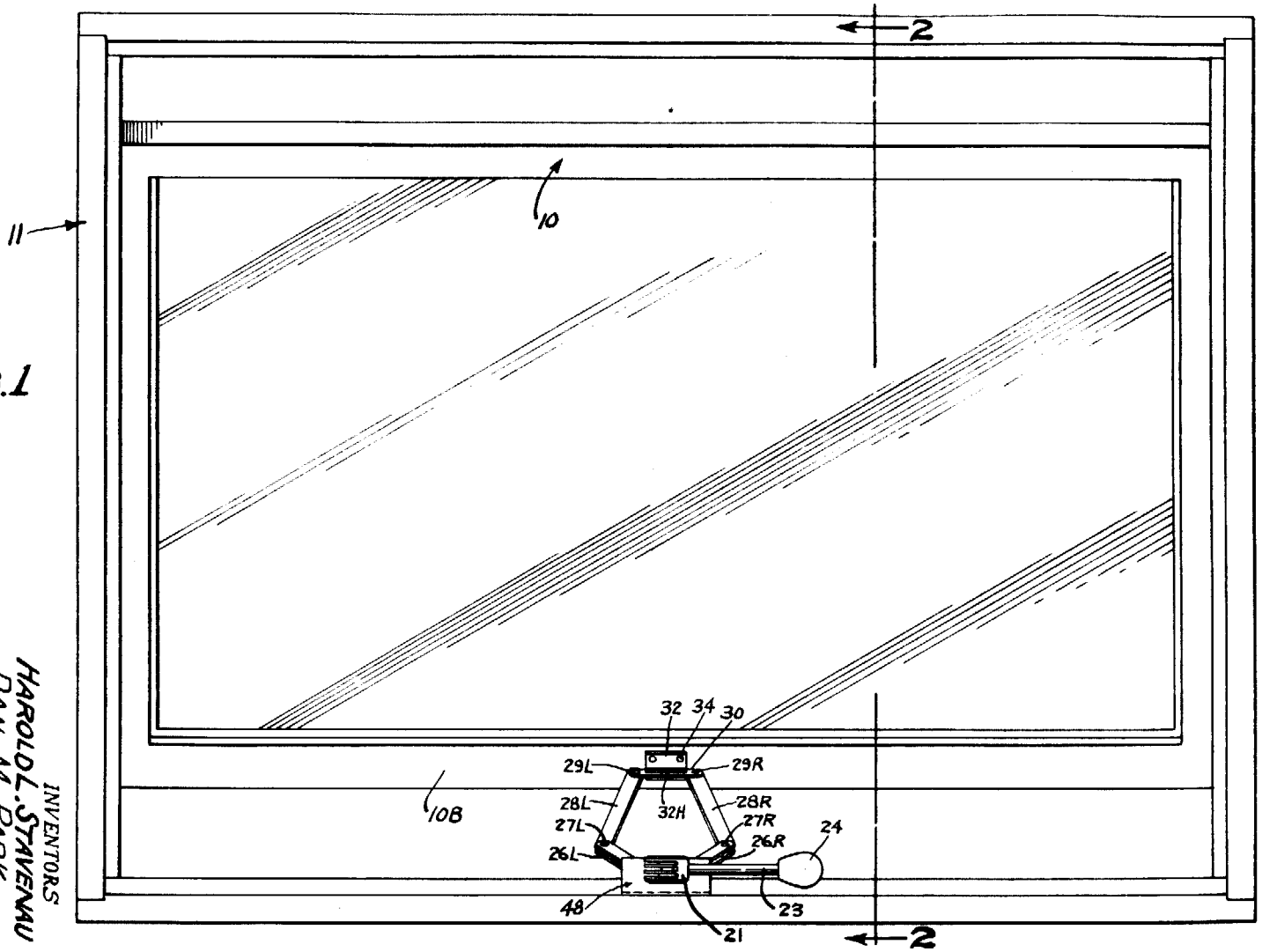
FIGURE 1 is an elevational view of a modern canopy-type window, shown from the inside and opened, and having the closure operator of the present invention attached to it.
Figure 3:
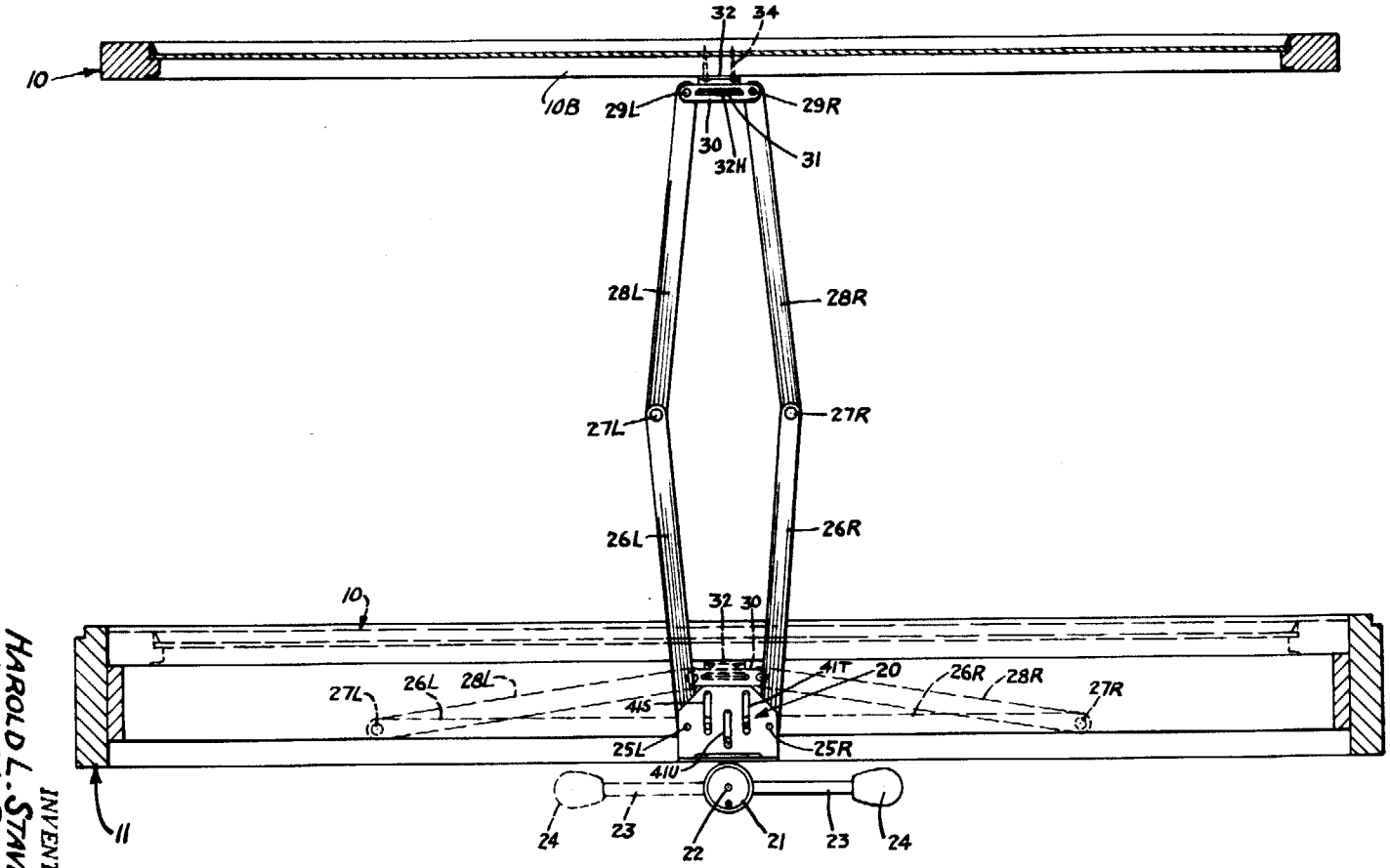
FIGURE 3 is a generally horizontal sectional view of the window and operator, taken along the line and in the direction of arrows 3—3 of FIGURE 2.

Referring to the drawings, FIGURES 1–3 illustrate a typical modern canopy window generally designated 10 which is made and sold, mounted in its frame, generally designated 11. The window is attached to the window frame at the upper side portions of the window (indicated at 12) by means of a sliding connection, not illustrated, of which there are several forms in use. The slidable connection in effect provides a vertical track or groove vertically along the upper side portions of the window frame and the window is provided with a co-operating pin or other device 12 which not only slides vertically but is also free to journal in the track. By this means the top window member 10A is permitted to move from the full line position of FIGURE 12, downward to any desired position within the limits provided. The window 10 is stabilized and braced by radius rods 14—14 at each side of the window. The radius rods serve to provide a pivotal path of motion for the pivot points 15—15 at opposite sides of the window and hence as the top portion of the window moves downwardly, the plane of the window is swung out.

The usual degree of movements are shown in FIGURE 2. These include the "closed position," shown in dotted lines and any degree of opening movement to and including the "full open" position shown in full lines. This range of movement is what is accommodated by the window operating mechanism during normal movement. However, the window may be unhooked from the window-operating mechanism and be moved further to the servicing position for window washing, servicing storm windows, etc. It is noted parenthetically that the storm sash, in this design, is a thin metal edged sash and is mounted against the outer face of the window as denoted at SS in FIGURE 2. The details of canopy window construction vary somewhat but the general configuration and the motions are approximately as here illustrated. The details of the window construction do not, per se, form a part of the present invention except as they may be necessarily included in the novel combinations claimed.

One representative form of our closure operator mechanism of the present invention is shown applied to the window and frame of FIGURES 1–3. In general the mechanism comprises a frame assembly, generally designated 20 on which a crank drum 21 is mounted for rotation on pivot pin 22. The crank drum is rotated by a lever arm 23 having knob 24 thereon. On the frame assembly there are two pivots 25L and 25R upon which the lever arms 26L and 26R are adapted to swing. Within the frame assembly 20 there are provided mechanical linkages (which will be described) by means of which the arms 26L and 26R are swung simultaneously toward or away from each other by swinging the crank-lever knob assembly 21–23–24.

At the outer ends of each of the levers 26L and 26R there are pivots 27L and 27R to which the proximate ends of links 28L and 28R are pivotally attached. The distal ends of the links 28L and 28R are in turn each pivotally attached at pivots 29L and 29R to a clip bar 30 which has an elongated slot 31 in it. The slot 31 is fashioned so as to receive the hook generally designated 32 which has a reach portion 32R, and an upturned tip or hook end 32H. Hook 32 is fastened to the outwardly movable (and in FIGURES 2, 7 and 11 the lower) window frame portion 10B by screws 34 having round or other protuberant heads 34H. The shaping and size of the bar 30, slot 31 and hook 32, and the size and position of the screw (or other fastener) heads 34H is of some importance, since the screw head 34H will, in the FIGURE 7 position of the parts, serve as a stop to prevent direct upward movement of the bar 30 and thus prevent its intentional or unintentional displacement of bar 30. Yet when the window opener mechanism is operated so as to bring the window and operator parts to the positions shown in full lines in FIGURE 2, the consequent tilting of the hook 32 relative to the bar 30 will permit sufficient clearance to allow lifting of the bar 30 to the position shown in dotted lines in FIGURE 11, and its disengagement from the hook 32, which is consequently freed. The window can then be brought down manually to the "servicing position" shown in FIGURE 2. To re-engage the window operating mechanism the procedure is reversed. The shape of the hook 32, bar 30 and the size and position of the screw heads 34H are selected so as to permit separation of the bar 30 from the hook 32 only when the window has been moved to at least a partially opened position.

The pairs of arms 26L–28L and 26R and 28R provide what may be denoted as a "scissors movement." The linkage is strong and durable. The elongation of the slot 31 in bar 30 and generous width of hook end 34H stabilizes bar 30 against rotation about any generally upright axis but rotation is permitted about an axis parallel to the slot 31 (see FIGURES 2, 7 and 11), thereby permitting rotation of the hook 32 coincidental to the changing plane of the window 10 as it is opened or closed.

It will be noted that the change in elevation of the hook 32 as the window is opened will cause an upward simultaneous flexure of the scissors-arm pairs 26L–28L and 26R–28R. The flexibility of the material of which these parts are made permits this. The resultant extra downward tension of the scissors arms on the hook 32 (and window 10), when the window is in the full open position (see FIGURES 2 and 11) will provide additional stability for the window against movement or rattling when it is wide open. This is an advantage, and is a feature of the invention.

The internal mechanisms of the frame assembly 20, by which the foregoing window operating motions of the device are accomplished, will now be described. Referring particularly to FIGURES 4–8, the frame mechanism includes an upper frame plate 41 and a lower frame plate 42. For reducing manufacturing costs these are preferably made identical. In the illustrated form, each plate has the shape as for plate 41 in FIGURE 5, as follows: Towards the inside of the building an edge 41A through to 41D. Midway between these points the edge is preferably indented marginally as at 41B to 41C, to allow space for a small vertical insect-guard plate 43 to slide from side-to-side, as shown in FIGURES 9 and 10. From point 41D the edge of plate 41 continues forwardly toward the front edge 41F—41G which is preferably parallel to the window portion 10B but spaced sufficiently therefrom to allow bar 30 and hook 32 (plus a little clearance) when the window is fully closed as shown in FIGURE 4. In the illustrated form the plate 41 is cut off at 45° at corners 41E—41F and 41G—41H, but this is not an essential. Plate 41 (and 42) each are provided with a rearwardly extending tongue as at 41J for plate 41, which is smoothly rounded at the front end 41K and provided with a pivot hole 41L which serves to receive the pin 22 upon which crank drum 21 rotates.

In addition the plates 41 (and 42) each have holes, as for plate 41, as follows: Two spaced holes 41M and 41N which receive pivot pins 25L and 25R respectively, upon which the arms 26L and 26R respectively, are pivoted; hole 41P through which a back mounting screw 46 is placed and two holes 41Q and 41R through which screws 47 which hold the front bracket plate generally designated 48, can entirely pass. Note that when the mechanism is operated to the FIGURE 4 position the screws 47 can be placed and a screwdriver inserted for tightening them. In addition plates 41 and 42 have slots, as for plate 41, as follows: Three spaced parallel fore and aft slots 41S, 41T and 41U. The middle slot 41U is displaced inwardly.

The front bracket plate 48 has a rearwardly extending foot 48A and a vertical front surface 48B. The foot is punched appropriately to locate the holes for screws 47 immediately below the holes 41Q—41R of plate 41, when the vertical surface 48B of plate 48 is in contact with the front edge line 41A—41D and plate 48 is aligned laterally. The front 48B is provided with a rectangular hole 48C which permits tongues 41J and 42J to pass therethrough. The rectangular slot has an extending notch 48D at the left side to allow clearance for link 50.

The plates 41 and 42 are thus positioned and spaced. At their rear edges plates 41 and 42 are held by the screw 46, the plates being held apart by sleeve 49.

The laterally extending notch 48D accommodates connecting link 50 which has its rear end pivoted at pins 51 in the crank drum 21 and at its forward end has affixed to it a vertical front pin 52 which is long enough to extend into and hence slide forwardly and rearwardly in the slots 41U and 42U of plates 41 and 42, respectively. Hence the rear end of link 50 has a sidewise movement at its middle and rear ends.

Of course, the link 50 and tongues 41J—42J do not entirely fill the rectangular hole 48C and to close off the unfilled space there is provided the little slidable insect guard plate 43. It has three slots but here the centre slot 43B is punched so as neatly to fit around the link 50, and the upper and lower slots 43A and 43C respectively have lengths sufficient to allow the plate to move sidewise to and fro, between the positions shown in FIGURES 9 and 10. The indented edge at 41B—41C of plate 41 (correspondingly for plate 42) allows enough space for the thickness of plate 43 to slide edgewise. The action of plates 43 and 48 in co-operation thus always provides a closure which is complete against insect entrance. It may be stated parenthetically that the insect screen is placed in the space between lines 11A and 11B (see FIGURE 2) and the lower edge of the screen frame is notched so as to fit over the window operator frame assembly, and that were it not for the closure plate 43 a slight opening would exist in hole 48C.

Between the top plate 41 and bottom plate 42 is a three level tier of operating parts, labeled respectively as the top, middle, and bottom tiers, see FIGURE 8. In general it may be stated that for balancing the operating forces, the elements of the top and bottom tiers are duplicated. Thus each of the arms 26L and 26R are composed of a top and bottom identical elements and these are in the top and bottom tiers. Thus, as shown in FIGURES 4, 5 and 6 there are a top and bottom pair of arms 26L (top) and 26L (bottom) which together make up the arm 26L. These pivot as a unit on tubular pin 25L which is turned to provide a spacing collar 25L' at its middle, for holding the arms apart by a distance equalling the thickness of the middle tier, plus working clearance. Similarly the arm 26R is composed of a top piece 26R (top) and an identical bottom piece 26R (bottom) which similarly pivot on a collared hollow pin 25R (collar 25R'). Then at the inner end of each of the arms 26L and 26R is provided a hollow pin pivot (roll pin) as at 54L (for arm 26L) and 54R (for arm 26R). These pivot pins are long enough to extend from the upper surface of lower frame plate 42 to the under surface of upper frame plate 41. To these pins there are respectively attached the inner end of drag links 55L and 55R, both of which reside in the middle tier. These drag links are of identical length and extend forwardly (as shown in FIGURE 4) and each is provided with a hollow pivot pin (roll pin) as at 56L for link 55L and 56R for link 55R. Pins 56R and 56L are of a length such that they reach from the bottom surface of lower frame plate 42 to the top surface of upper frame plate 41 and their upper and lower ends reside in and move back and forth in the matching slots of the upper and lower frame plates. Thus pin 56L works in the matching slots 41S—42S and pin 56R works in the matching slots 41T—42T. Thus pins 56L and 56R follow straight line paths fore and aft, whereas pins 54L and R follow arcuate paths. The motions of the links 55L and R are defined by these straight and arcuate paths of the pivot pins.

In the upper and lower level tiers and pivotally connected to the pins 56L and 56R are an identical (upper and lower) pair of bent single-tree levers 57T and 57B. These each have a pivot hole at the middle to receive a hollow pivot pin 52, which is of a length such that it reaches from the lower surface of lower frame plate 41 to the upper surface of upper frame plate 42. Pin 52 connects the front end of connecting link 50 (which is in the middle tier) to the center point of each of the bent levers 57T (top) and 57B (bottom). The upper and lower ends of pin 52 work back and forth in the middle slots 41U and 42U of the bottom and top frame plates.

The crank drum 21 has slots extending straight across at the levels of the top and bottom plates and the middle tier. The slots extend more than half way through; thus (see FIGURE 4), from point 21A around the arc 21A, 21B, 21C to point 21C, thence back across the chord 21C—21A. Each slot is wide enough to accommodate with clearance the plate or tier component extending into the slot. Thus (see FIGURE 7), tongues 41J and 42J fit neatly with working clearance into the appropriate top and bottom slots of the crank drum. The pivot 22 of the drum is made in two pieces and does not extend across the middle slot (see FIGURE 7). When the handle 23—24 is swung arcuately in the direction of arrow 59 from the full line ("closed") position the pivot 51 will traverse the path of arrows 60—61 through the "half open" to the "full open" position of FIGURE 5. In so doing the link 50 will be pulled in a direction away from the window (downwardly in FIGURES 4 and 5) and this then pulls the pair of (top and bottom) bent levers 57T and 57B correspondingly and these in turn push back on links 55L and 55R and cause the arms 26L and 26R to swing in the direction of arrows 63 and 64, respectively. This propels the links 28L and 28R forwardly and together (at their rearward ends) from position of FIGURE 4 to position of FIGURE 5 and the window is opened. All forces are balanced in the thus described motions. The linkages are set up tight enough so that they will frictionally hold the parts and hence the window in any intermediate position or in the fully opened position.

When the device is used for operating casement windows, it may be mounted on the left or right sides of the stationary frame about midway between the top and bottom. The only difference, as compared with the canopy window, is that the casement window motion is a swinging motion as compared to the swinging and sliding motion of the canopy window.

As an alternative mode of casement window installation, one or the other of the scissors pair linkages (26L–28L or 26R–28L) can be taken out of the mechanism and discarded, or the mechanism built so as to include only one linkage pair. This mode of installation is illustrated in FIGURES 12 and 13, where only the left linkage pair 26L–28L is retained. In addition, the bar 30 is discarded and a fixture 65, having a pivot pin 66 thereon is provided on the bottom of the swinging casement sash CS. The link 28L is flexed so that it will press down on the pivot 66, yet it can spring up so as to be released, if so desired.

In this mode of operation the linkages are balances except for the bent levers 57B and 57T which is consequently unloaded on one side. Any cocking of these bent levers is prevented, however, by the sliding of pins 52 and 56L and 56R in the slots 41S, 41T and 41U, respectively, which cause the bent levers always to move as in a translatory motion.

The operating mechanism of the present invention may be used for operating round, oval or other odd shaped windows.

As many variations in mode of construction of the apparatus herein illustrated and described will suggest themselves to those skilled in the art, the invention is not limited except as defined in the appended claims.

We claim:

1. *The combination with a window frame and a window mounted to move between open and closed conditions with respect to said window frame, of* a closure operator comprising a *support* frame *mounted on the window frame,* an arm mounted on an arm pivot on the *support* frame and extending therefrom for swinging movement relative to said *support* frame, a manual member pivotally mounted on the *support* frame for oscillatory rotation through *only* less than one complete turn *in a plane normal to the window when the window is in its closed condition between limiting positions generally*

*parallel to said window frame* about an axis generally parallel to but spaced from the arm pivot [and] , link means eccentrically connected pivotally to said manual member and pivotally connected to said arm for swinging the arm as said manual member is rotated *between its limiting positions,* and connection means having freedom of motion about an axis parallel to the arm pivot and in a plane normal to said *last named* axis by which said arm may be attached to said closure.

2. The closure operator of claim 1 further characterized in that a pair of arms are mounted respectively on spaced parallel arm pivots on said *support* frame and each extending therefrom for swinging movement in opposite directions from a position where they extend generally away from each other to a position in which they extend generally in the same direction, each of said arms being pivotally connected to said link means so as to be swung when said manual member is oscillatably rotated *between said limiting positions,* and said connection means includes means pivotally attached respectively to each of said pair of arms.

3. The closure operator of claim 1 further characterized in that said link means includes a member mounted on the frame for translatory oscillation as said manual member is oscillated.

4. The closure operator of claim 1 further characterized in that said arm is composed of duplicate elements in spaced superimposed position and said link means includes an element positioned between them and connected to said elements by means of a pivot having an axis parallel to and spaced from said arm pivot.

5. The closure operator of claim 1 further characterized in that said arm is composed of duplicate elements in spaced superimposed position and said connection means includes a radius strip extending between the ends of said duplicate elements and pivotal therewith at a common pivot.

6. The closure operator of claim 1 further characterized in that said connection means includes a hook element adapted to be secured to the closure which is to be operated and a keeper shaped to be detachable from the hook element only when the closure operator and closure are operated to position said closure in at least a partially opened condition.

7. The closure operator of claim 1 further characterized in that said arm has more stiffness against deflection when moved in a plane thru said arm than when moved out of said plane.

8. A closure operator comprising a frame composed of superimposed frame plates each of which has a projecting portion having a pivot hole therein, a support plate having a slot therein for snugly receiving the projecting portions of said plates in a normal direction therethru for thereby supporting said frame plates spaced from each other in parallel superimposed position, said projecting portions being of sufficient length so as to extend sufficiently beyond the support plate after passing therethru so as to locate said pivot hole at a position removed from said support plate, an additional spacer element between said plates at a position spaced from said support plate for additionally supporting said frame plates in spaced parallel condition, a rotatable cylinder having a slot formed therein transverse to the axis thereof, said cylinder being mounted for rotation on said projecting portions on an axis normal thereto, an operator handle mounted on said cylinder for manually oscillating it, an additional pivot extending through said frame plates on that portion thereof which is on the opposite side of said support plate from said cylinder, an arm extending in between said frame plates and pivotally journalled on said additional pivot, at least a portion of said arm extending well beyond said frame plates and having securing means at the outer end thereof by which it is adapted to be loosely secured to a closure for moving it, and link means having one end eccentrically connected pivotally to said cylinder and extending through said support plate and connected by pivot means to said arm at a point along said arm removed from said additional pivot.

9. The closure operator of claim 8 further characterized in that said arm is composed of duplicate superimposed elements spaced from each other and said link means includes a portion extending between them and connected thereto by said pivot means.

10. The closure operator of claim 8 further characterized in that said frame plates each are provided with slots which are located so as to be aligned when the frame plates are superimposed and said link means includes a slider positioned between said frame plates and bearing means normal to said slider and extending into said slots for restraining said slider from all but substantially translatory motion, said slider being connected by a first means to said cylinder and by a second link to said arm.

11. The closure operator of claim 10 further characterized in that said slider and arm each are composed of duplicate superimposed pairs of elements in spaced planes, said first link is situated in the space between said spaced planes.

12. The closure operator of claim 8 further characterized in that right and left arms are provided and disposed on said frame in symmetrical arrangement on opposite sides of a theoretical centerplane through the axis of said cylinder and substantially normal to the plane of the closure with which the device is used, when said closure is in closed position, each said arm being pivoted similarly upon a pivot through the frame and each being connected by said link means to said cylinder so as to be radially oscillatable from one limiting position in which said arms extend outwardly from said theoretical centerplane to another limiting position in which they extend generally along opposite sides of said centerplane, and said securing means includes long links pivotally attached respectively to the outer ends of said arms said long links being pivotally connected by a securing element.

13. The closure operator of claim 8 further characterized in that said support plate has an aperture therethru sufficiently large so as to permit the link means to oscillate sideways as it is moved, and a thin slide plate is provided against said support plate for covering said aperture, said slide plate being provided with an aperture snugly receiving said link means which is passed therethru, said slide plate being shaped so as to be movable sideways back and forth as the link means is operated therethru.

14. The combination with a window frame and a window mounted to move between open and closed conditions with respect to said frame; of a window operator including a support plate mounted in said frame, a crank rotatably mounted on a central first axis thereof on said support plate, means for rotating said crank, an operator link pivotally mounted on said crank about a second axis parallel to and spaced from said central first axis, said support plate being provided with an operator-cross link slot extending radially outwardly from said central axis and a cross-connector slot spaced from and parallel to said opeartor-cross link slot, a cross link, an operator-cross link pin riding in said operator-cross link slot and pivotally connecting said operator link to said cross link, a connector link, a cross-connector link pin riding in said cross-connector slot and pivotally connecting an outer end of said cross link to said connector link, an operator arm pivotally mounted on said support plate and pivotally connected to said connector link, a connector arm pivotally connected to said operator arm, and means for attaching said connector arm to said window.

15. The combination with a window frame and a window mounted to move between open and closed conditions with respect to said frame; of a window operator including a support plate mounted in said window frame, a crank rotatably mounted on a central axis thereof on said support plate, means for rotating said crank, an operator link pivotally mounted on said crank about an axis parallel to and spaced from said central axis, said support plate being provided with an operator-cross link slot extending radially outwardly from said central axis and a pair of cross-connector link slots spaced equal distance from, parallel to and on opposite sides of said operator-cross link slot, a cross link, an operator-cross link pin riding in said operator-cross link slot and pivotally connecting said operator link to said cross link, a pair of connector links, a pair of cross-connector link pins each riding in one of said cross-connector link slots and pivotally connecting outer ends of said cross link to one of said connector links, a pair of operator arms each pivotally mounted on said support plate and each pivotally connected to one of said connector links a pair of connector arms each pivotally connected to one of said operator arms, and means for attaching each of said connector arms to said window.

16. The combination as specified in claim 15 wherein said operator link, said connector links and said connector arms lie in a single plane, and said cross links and operator arms each consist of separate identical upper and lower members adjacent links and arms which lie in said single plane.

17. The combination as specified in claim 16 wherein said support plate includes spaced apart, parallel upper and lower members each of which are provided with an operator-cross link slot and with cross-connector link slots, said upper and lower support plate members together being in sandwiching relationship to said operator link, cross links, connector links and end portions of said operator arms.

18. The combination with a window frame and a window mounted to move between open and closed conditions with respect to said frame; of a window operator including a support plate mounted in said window frame, a crank rotatably mounted on a central first axis thereof on said support plate for rotation through approximately 180 degrees, a handle for rotating said crank, an operator link pivotally mounted on said crank about a second axis parallel to and spaced from said first axis, said support plate being provided with an operator-cross link slot extending radially outwardly from said first axis and a pair of cross-connector link slots equal distance from, parallel to and on opposite sides of said operator-cross link slot, a cross link, an operator cross link pin riding in said operator-cross link slot and pivotally connecting said operator link to said cross link, a pair of connector links, a pair of cross-connector link pins each riding in one of said cross-connector link slots and pivotally connecting outer ends of said cross link to one of said connector links, a pair of operator arms each pivotally mounted on said support plate and each pivotally connected to one of said connector links, a pair of connector arms each pivotally connected to one of said operator arms, an eye member pivotally connected to each of said connector arms and a hook member mounted on said window and removably mounted in said eye member.

19. The combination as specified in claim 18 wherein rotation of said crank causes said second axis to rotate about said first axis at a side of a radial plane extending outwardly from said first axis and containing a longitudinal axis of said operator-cross link slot as said window moves from open toward closed condition, the relationship of the parts being such that said eye member contacts at least one of said connector links and cross links in advance of said second axis reaching position in said radial plane, and wherein further rotation of said crank after said eye member makes said contact causes said second axis to move to position at a second side of said radial plane against the resilience of said connector and operator arms.

*20. The combination with a window frame and a window mounted to move between open and closed conditions with respect to said window frame, of a window operator including a support frame mounted on said window frame, an arm mounted on an arm pivot on the support frame and extending therefrom for swinging movement relative to the support frame from one limiting position in which said arm extends outwardly from said window frame to another limiting position generally along said window frame, a manual member pivotally mounted on the support frame for oscillatory rotation through less than one complete turn in a plane normal to the window when the window is in its closed condition between limiting positions generally parallel to and adjacent said window frame about an axis generally parallel to but spaced from the arm pivot, link means eccentrically connected pivotally to said manual member and pivotally connected to said arm for swinging the arm between its limiting positions as said manual member is rotated between its limiting positions, said limiting positions of the manual member operatively corresponding to the limiting positions of said arms to perceptibly indicate to a user which direction to rotate the manual member relative to the window frame when in said limiting positions, and connection means having freedom of motion about an axis parallel to the arm pivot and in a plane normal to said last named axis by which said arm may be attached to the window.*

References Cited

The following references, cited by the Examiner, are of record in the patented file of this patent or the original patent.

UNITED STATES PATENTS

| | | | |
|---|---|---|---|
| 1,306,292 | 6/1919 | Voight | 49—338 |
| 1,387,432 | 8/1921 | Gebhard | 49—353 |

DAVID J. WILLIAMOWSKY, *Primary Examiner.*

U.S. Cl. X.R.

49—338, 353